United States Patent [19]
Iwatsu et al.

[11] Patent Number: 5,707,758
[45] Date of Patent: Jan. 13, 1998

[54] SECONDARY BATTERY

[75] Inventors: Satoshi Iwatsu, Tokyo; Tatsuo Shimizu; Hideya Takahashi, both of Koriyama; Yosuke Kita, Tokyo; Kiyoshi Katayama, Koriyama; Etsuo Ogami, Kanagawa-ken, all of Japan

[73] Assignee: Nissan Motor Co., Ltd., Yokohama, Japan

[21] Appl. No.: 714,446

[22] Filed: Sep. 16, 1996

[30] Foreign Application Priority Data

Sep. 27, 1995 [JP] Japan .................................. 7-249943
Sep. 27, 1995 [JP] Japan .................................. 7-249944

[51] Int. Cl.$^6$ ........................................... H01M 2/30
[52] U.S. Cl. ........................ 429/94; 429/181; 429/183
[58] Field of Search ............................. 429/94, 181, 183, 429/171, 172, 185, 178, 174

[56] References Cited

U.S. PATENT DOCUMENTS

| | | | |
|---|---|---|---|
| 3,678,178 | 7/1972 | Hubbauer et al. | 429/181 |
| 4,049,889 | 9/1977 | Heintz | 429/174 |
| 4,224,388 | 9/1980 | Stadnick | 429/181 |
| 4,904,551 | 2/1990 | Denoncourt et al. | 429/181 |

*Primary Examiner*—Anthony Skapars
*Attorney, Agent, or Firm*—Foley & Lardner

[57] ABSTRACT

A nonaqueous electrolytic secondary battery is formed by winding a thin-film positive electrode, a thin-film negative electrode, and a thin-film separator. A cap is arranged at the distal end portion of a pole bored through the cap and interposed between a nut and a disk-like portion of the pole through a ceramic washer being in contact with the nut and a ceramic patch being in contact with the disk-like portion. The ceramic washer and the ceramic patch consist of alumina or zirconia. For a bolt for interposing a bus bar or a conductive line to fix the bus bar or the conductive line, a female screw portion formed in the pole is arranged in a space of a spindle.

9 Claims, 7 Drawing Sheets

SECONDARY BATTERY

BACKGROUND OF THE INVENTION

1. Field of the Invention

The present invention relates to a secondary battery preferably applied as a large-size battery such as a main power source of electric vehicle having a large electric capacity.

2. Description of the Related Art

As a conventional method of assuring the insulating and sealing properties of a battery, a mold crimp method in which a pole and a cap for holding the pole are integrated with each other is employed.

As another method of assuring the insulating and sealing properties of a battery, a crimp method has been employed.

This crimp method is frequently used in a lithium secondary battery or a conventional primary battery.

However, in the conventional mold crimp method described above, leakage occurs because of the difference between the expansion coefficients of a plastic material and a conductive pole from high temperature to low temperature, e.g., in the temperature range of −40° C. to 70° C.

In a crimp method as another method, as in the mold crimp method, leakage occurs because of the difference between the expansion coefficients of a plastic material and a conductive pole from high temperature to low temperature (−40° C. to 70° C.).

Therefore, in particular, in a large-size EV battery, since the above methods require a wide use temperature range and anti-vibration properties, the methods cannot be easily used.

In a conventional cylindrical secondary battery formed by winding a thin-film electrode, a spindle on which a rolled electrode is wound must, be arranged to the central portion of the secondary battery, thereby forming a space.

In a small-size secondary battery of, e.g., 1 to 5 Ah class, in order to maximally gain a capacity, the size of the space is often limited to about 2 to 3 mm at most. This space is used, at most, as a buffer member (void) for an increase in pressure to prevent an internal pressure from being suddenly increased due to battery abnormality.

In a large-size battery such as an electric automobile power supply having a large electric capacity, a bus bar or a conductive line to be connected to a terminal must be increased in thickness according to a current flowing in the bus bar or conductive line. Unless a rigid contact portion between the bus bar or the conductive line and an electrode terminal is used, a contact failure occurs, and a portion having a high electric resistance dangerously generates heat.

For this reason, in order to reliably fix the bus bar or the conductive line to the electrode terminal, a bolt-fastening method is frequently used.

However, in order to assure a space for a screw portion, a volume energy density of the battery disadvantageously decreases.

SUMMARY OF THE INVENTION

It is the first object of the present invention to provide a secondary battery which can sufficiently assure insulating properties between a pole and a cap, can sufficiently withstand a compression force for fixing the pole to the cap by fastening a nut, and can hold the fastening force of the nut within a wide temperature range.

It is the second object of the present invention to provide a secondary battery which can assure a space for a screw portion for fixing a bus bar or a conductive line to a pole, and can considerably increase a volume energy density.

According to one aspect of the present invention there is provided a secondary battery in which a thin-film positive electrode, a thin-film negative electrode, and a separator are wound and stored in a battery vessel, comprising a cap for sealing an end opening portion of the battery vessel, a pole penetrating through the cap and having a disk-like portion, a nut arranged at the distal end portion of the pole, a ceramic washer being in contact with the nut, and a ceramic patch being in contact with the disk-like portion, wherein the cap is interposed between the ceramic washer and the ceramic patch and fastened by the disk-like portion of the pole and the nut.

The secondary battery according to the present invention has the above arrangement in which a ceramic washer and a ceramic patch are of alumina or zirconia.

The secondary battery according to the present invention is a nonaqueous electrolytic secondary battery having the above arrangement.

The secondary battery according to the present invention is a lithium-ion secondary battery having the above arrangement.

The secondary battery according to the present invention is a large-size battery having the above arrangement and an electric capacity of 10 to 500 Ah.

With the second battery of the present invention, the cap is arranged at the distal end portion of the pole bored through the cap, and interposed between the nut and the disk-like portion of the pole through the ceramic washer being in contact with the nut and the ceramic patch being in contact with the disk-like portion. Therefore, the insulating properties between the pole and the cap can be assured, and strong and stable fastening force can be obtained.

According to another aspect of the present invention, there is provided a secondary battery comprising a battery vessel, an electrode roll member obtained by winding a thin-film positive electrode, a thin-film negative electrode, and a thin-film separator and stored in the battery vessel, a pole arranged at an opening portion of the battery vessel and having a female screw portion with which a bolt for interposing a bus bar or a conductive line between the bolt and the female screw portion is meshed, the female screw portion being arranged in a central space of the electrode roll member.

The secondary battery according to the present invention is a nonaqueous electrolytic solution, i.e., a lithium-ion secondary battery, having an electric capacity of 10 to 500 Ah and the above arrangement.

DETAILED DESCRIPTION OF THE PREFERRED EMBODIMENT

A secondary battery according to an embodiment of the present invention will be described below with reference to FIGS. 1 to 7.

Figure 1:
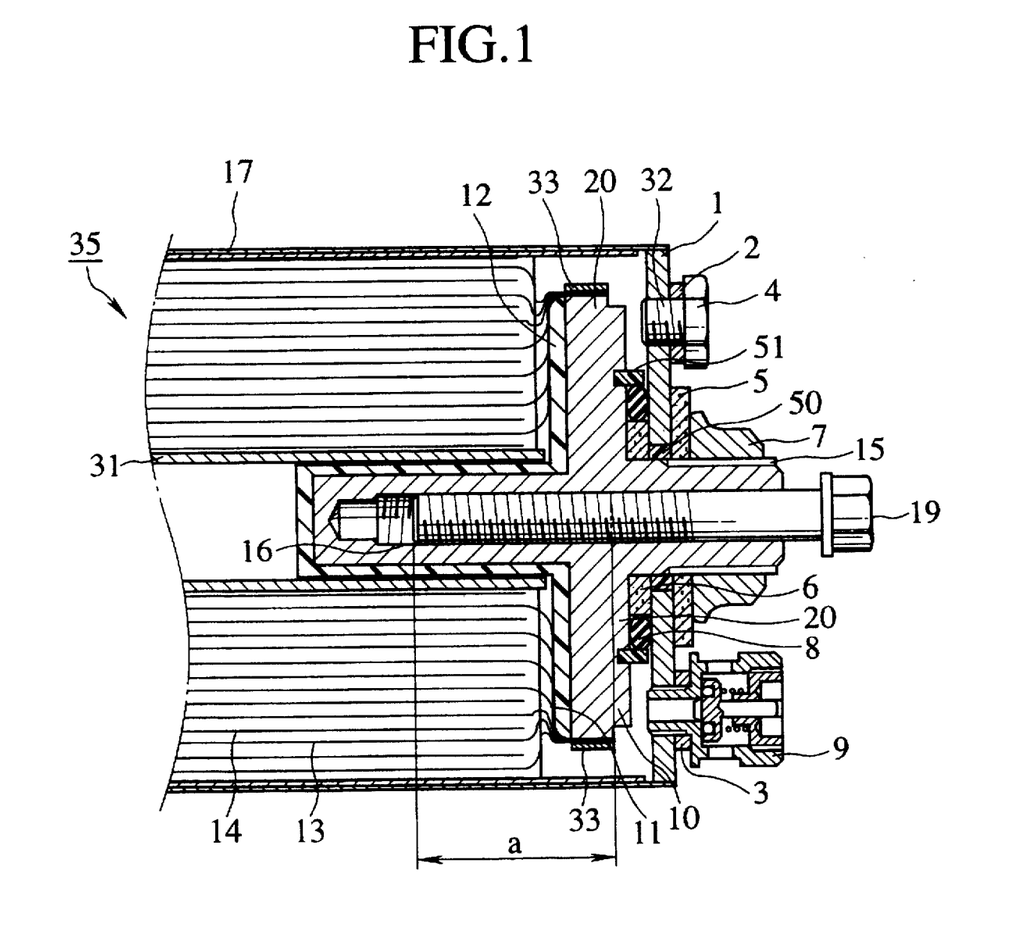
FIG. 1 is a sectional view showing a main part of a secondary battery according to an embodiment of the present invention.
Figure 2:
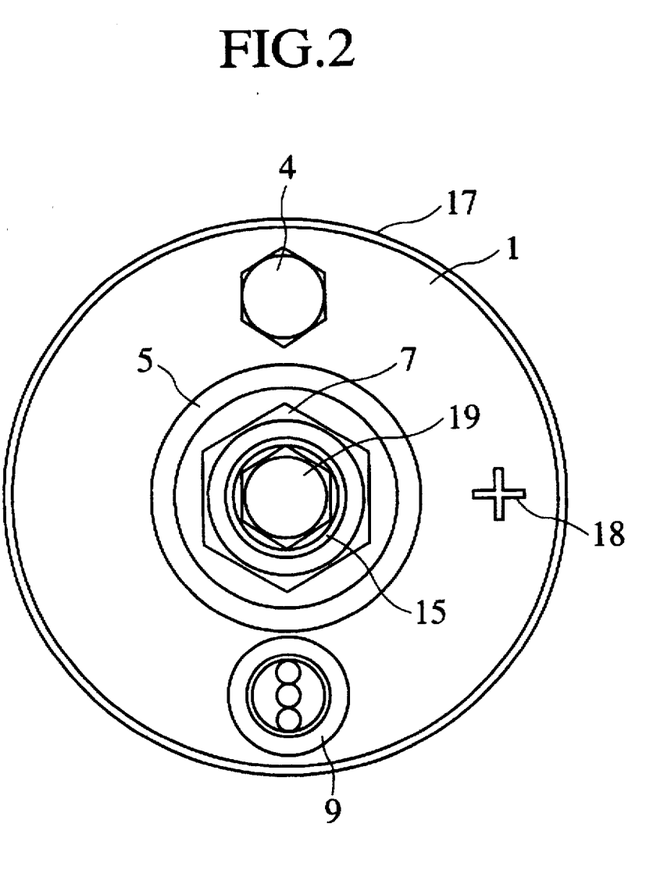
FIG. 2 is a side view showing a main part of the secondary battery according to the embodiment of the present invention.
Figure 5:
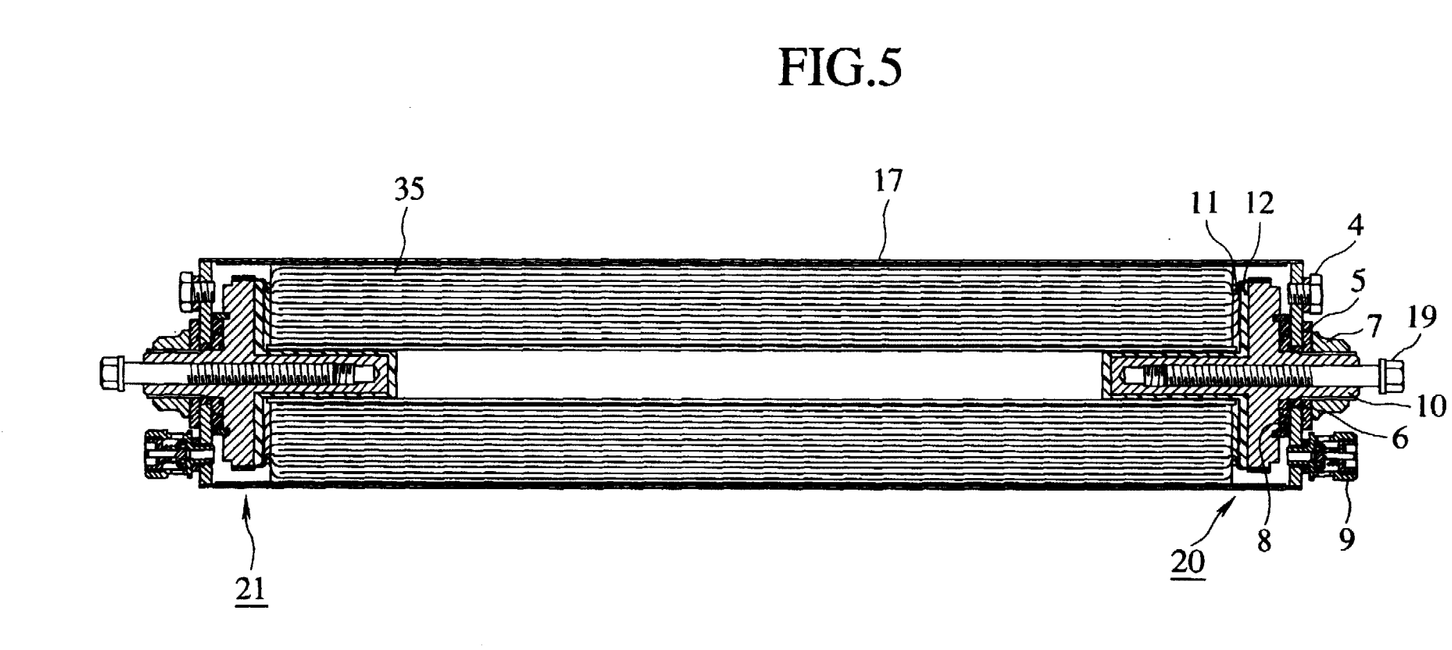
FIG. 5 is a sectional view showing the entire arrangement of the secondary battery according to the embodiment of the present invention.

FIGS. 1 and 2 are sectional and side views showing a main part of a lithium-ion secondary battery according to this embodiment. FIG. 5 briefly shows the entire arrangement of the lithium-ion secondary battery of this embodiment.

Figure 4:
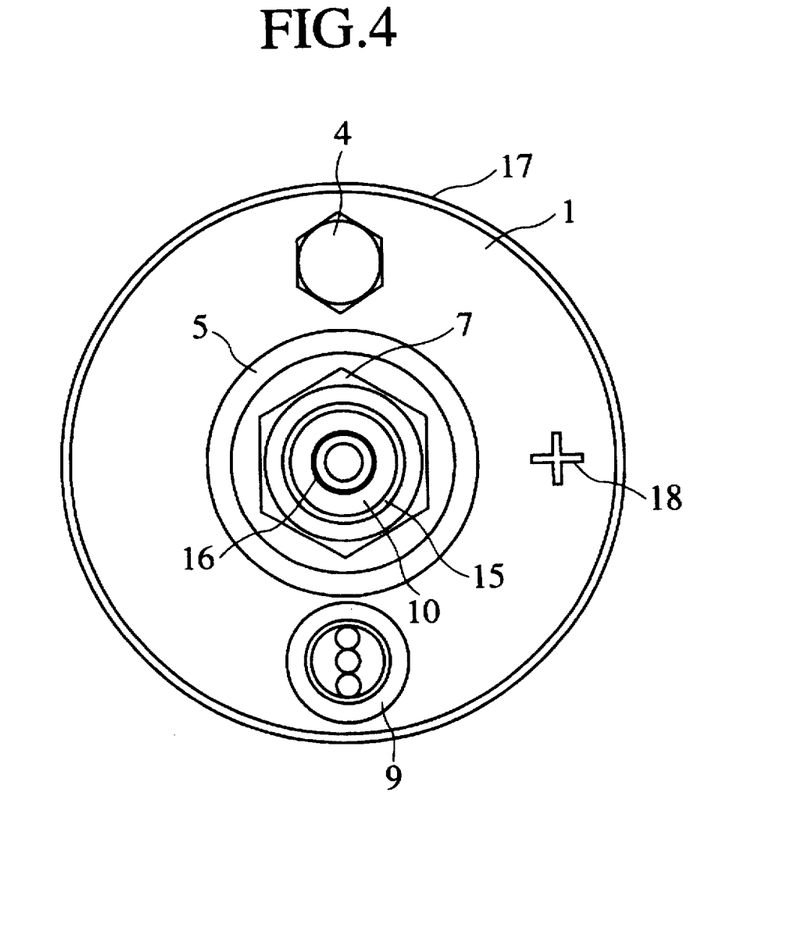
FIG. 4 is a sectional view showing a main part of the secondary battery according to the embodiment of the present invention.

In this embodiment, as shown in FIG. 5, an electrode roll member 35 is stored in a cylindrical battery vessel 17. The electrode roll member 35, as shown in FIG. 4, is constituted such that a thin-film negative electrode 14 and a thin-film positive electrode 13 are wound on a spindle 31 through separators 30.

In this case, a method of fabricating the negative electrode 14 will be described below.

As an active material of the negative electrode 14, a carbon material powder having an average grain size of 20 μm and prepared as follows is used. 10 to 20% of a functional group containing oxygen are added (so-called bridge formation) to petroleum pitch serving as a raw material. The resultant material is thermally treated at 1,000° C. in inert gas flow to obtain a carbon material having properties close to those of glass-like carbon. The carbon material is ground.

90% by weight of the carbon material powder is mixed with 10% by weight of polyvinyliden fluoride (PVDF) serving as a binder, and the mixture is dispersed in a solution (N-methyl pyrolidone) to form a slurry-like material. The slurry-like negative active material is uniformly coated on both the surfaces of a negative current collector consisting of a thin copper foil having a thickness of 10 μm to fabricate a negative electrode original plate having a thickness of 180 μm, and the negative electrode original plate is cut in the form of a belt except for an uncoated portion serving as the lead portion of the negative electrode on the side portion. The shape of the negative electrode 14 has a width of 383 mm which includes a 348 mm coated portion and a 35 mm uncoated portion. The length of the negative electrode 14 is 6,940 mm.

The positive electrode 13 is fabricated in the following manner.

More specifically, 91% by weight of $LiCoO_2$ powder having an average grain size of 15 μm, 6% by weight of graphite serving as a conductive agent, and 3% by weight of polyvinyliden fluoride serving as a binder are mixed with each other, and this mixture is dispersed in a solution (N-methyl pyrolidone) to form a slurry-like material. The slurry-like positive active material is uniformly coated on both the surfaces of a positive current collector consisting of a thin aluminum foil having a thickness of 20 μm to fabricate a positive electrode original plate having a thickness of 150 μm, and the positive electrode original plate is cut in the form of a belt except for an uncoated portion serving as the lead portion of the positive electrode on the side portion. The shape of the positive electrode 13 has a width of 379 mm which includes a 344 mm coated portion and a 35 mm uncoated portion. The length of the positive electrode is 7,150 mm.

The uncoated portions of the positive and negative electrodes 13 and 14 fabricated as described above are cut at a pitch of 15 mm in the form of stripes each having a width of 10 mm and a length of 30 mm, thereby obtaining stripe-like leads. In this case, the uncoated portions of the positive electrode 13 and the negative electrode 14 are entirely cut to have the above dimensions.

In this case, each stripe-like lead 11 must have a length larger than the length between the electrode end and the pole 10. The width of the stripe-like lead 11 is set such that the total sectional area of the stripe-like lead 11 satisfies the maximum energizing current value. In consideration of the bending properties of the stripe-like lead 11, the width of the stripe-like lead 11 is preferably set to be 10 mm or less.

Figure 6:
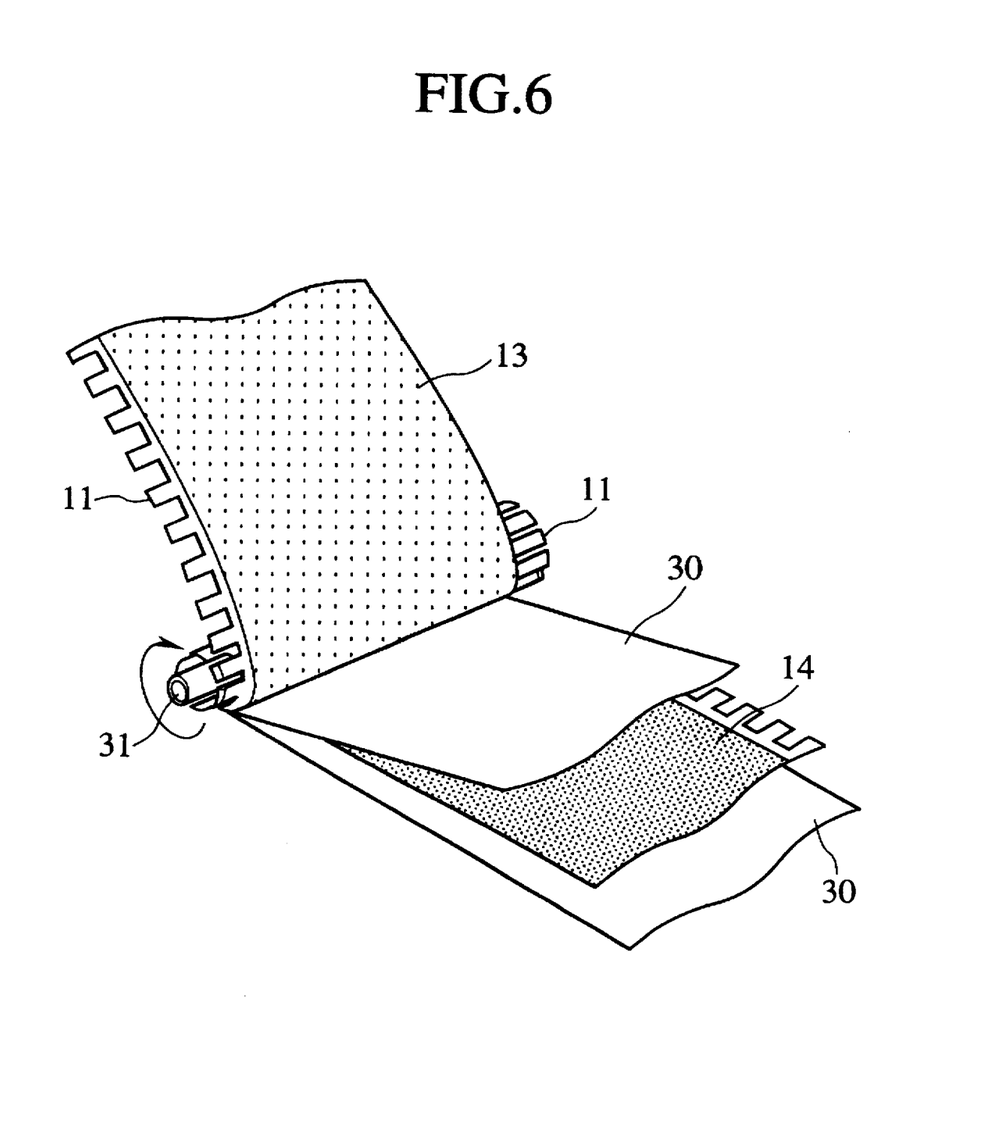
FIG. 6 is a perspective view showing a winding method of the positive and negative electrodes of the nonaqueous electrolytic secondary battery.

As shown in FIG. 6, the positive electrode 13, the negative electrode 14, and the separators 30 are stacked in the order of the positive electrode 13, the separator 30, the negative electrode 14, and the separator 30, and wound on the spindle 31, thereby forming the electrode roll member 35. At this time, in the electrode roll member 35, the positive electrode 13 and the negative electrode 14 are wound such that the stripe-like leads 11 of the positive electrode 13 are gathered on one side of the electrode roll member 35 and the stripe-like leads 11 of the negative electrode 14 are gathered on the other side of the electrode roll member 35.

Each separator 30 is a polyethylene sheet which is cut to have a size of 353×7,600 mm and a thickness of 38 μm and in which fine holes are formed.

The spindle 31 is a pure-aluminum cylinder having, e.g., an outer diameter of 17 mm, an inner diameter of 14 mm, and a length of 354 mm.

The stripe-like leads 11 are extracted from both the sides of the spindle 31 of the electrode roll member 35 as described above, a current obtained by the electrode current collector can be rapidly extracted. In addition, since the stripe-like leads 11 are formed in the form of narrow-short stripes, the stripe-like leads 11 can be easily deformed, and can be welded along the outer peripheral portion of a disk-like portion 20 of the pole 10.

After the positive electrode 13, the negative electrode 14, and the separators 30 are wound on the spindle 31, as shown in FIG. 1, the stripe-like leads 11 are pressed on the entire circumference of the outer peripheral portion of the disk-like portion 20 of the pole 10 by pressure metal fittings 33.

In the pole 10, pure aluminum (A1050) is used as the material of the positive electrode, and pure copper (C1100) is used as the material of the negative electrode. In the pressure metal fittings 33, pure aluminum (A1050) is used as the material of the positive electrode, and pure copper (C1100) is used as the material of the negative electrode.

The stripe-like leads 11 are pressed on the outer peripheral portion of the disk-like portion 20 of the pole 10 by the pressure metal fittings 33, and then the stripe-like leads 11 are cut at the upper end face of the disk-like portion 20 of the pole 10. Thereafter, laser beam is irradiated on the upper surface of the disk-like portion 20 of the pole 10 to weld the stripe-like leads 11 to the entire circumference of the disk-like portion 20.

In this manner, since the stripe-like leads 11 extracted from the electrode current collector are welded to the pole 10 such that the stripe-like leads 11 are joined to the pole 10 with a large area, a low internal resistance can be obtained, and a variation in internal resistance is small. In addition, because of the large area, a battery having excellent large-current discharge characteristics can be obtained.

The electrode roll member 35 and the pole 10 which are welded to each other incorporate a backup ring 51, a seal 8, a ceramic patch 6, a cap (lid) 1, a ring 50, and a ceramic washer 5, and are fastened by a nut 7.

Thereafter, as shown in FIG. 1, the outer periphery of the cap 1 is pressure-inserted into the battery vessel 17 and welded by laser. More specifically, a laser beam is irradiated from the upper surface of the cap 1 onto the circumference of the cap 1 to weld the cap 1 to the battery vessel 17, thereby air-tightly sealing the battery vessel 17.

In this manner, when the cap 1 of the battery vessel 17 is welded by the laser, a battery having a completely air-tight structure can be obtained.

The material of the battery vessel 17 is stainless steel (SUS304), and the thickness of the battery vessel 17 has the range of 0.3 to 0.5 mm. The material of the cap 1 is stainless steel (SUS304), and the thickness of the cap 1 is 3 mm.

In the battery structure, with respect to a case wherein a bolt is meshed with the pole, a sectional view of the case and a side view when viewed from a central axis direction are shown in FIGS. 1 and 2, respectively.

Figure 3:
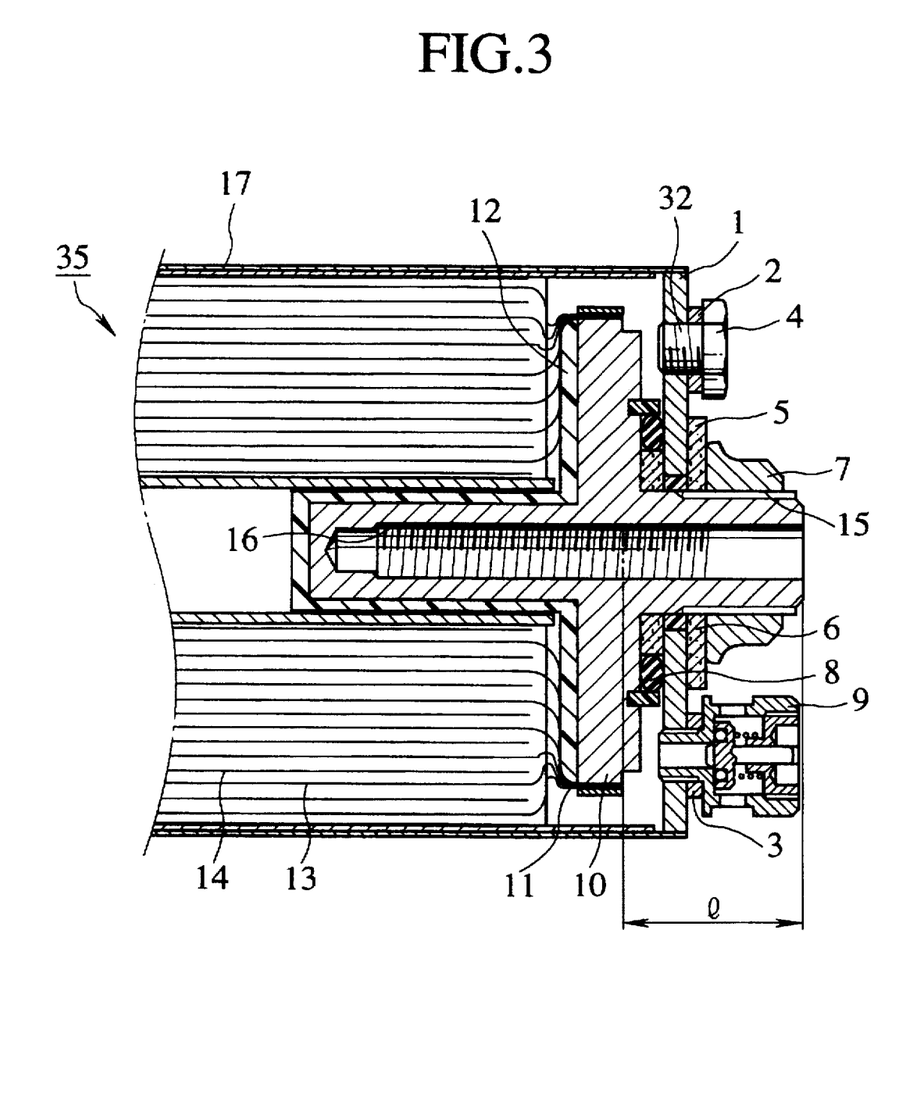
FIG. 3 is a sectional view showing a main part of the secondary battery according to the embodiment of the present invention.

With respect to a case wherein no bolt is meshed with the pole, a sectional view of the case and a side view when viewed from the central axis direction of the battery are shown in FIGS. 3 and 4.

As is apparent from FIGS. 1 and 3, a male screw (male screw portion 15) of M14 is formed outside the distal end portion of the positive pole 10. The nut 7 is fitted on the fasten screw portion 15. When the nut 7 is fastened, the cap 1 is interposed between the ceramic washer 5 and the ceramic patch 6 to fix the pole 10 itself to the cap 1. The seal 8 is interposed between the disk-like portion of the pole 10 and the cap 1, so that the pole 10 is air-tightly sealed to prevent the inner electrolytic solution from leaking.

As is apparent from FIGS. 1 and 3, a female screw (female screw portion 16) of M6 is formed in the central portion of the positive pole 10. The female screw portion 16 is used when wiring with an external circuit. More specifically, a bolt 19 is meshed with the female screw portion 16 to interpose a bus bar or a conductive line between the end surface of the distal end of the pole and the head portion of the bolt 19, thereby fixing the bus bar or the conductive line.

In this case, the reason why the female screw portion 16 is not directly arranged from the end face of the distal end portion of the pole 10, but is arranged at a deep position spaced from the male screw portion 15 will be described below.

As is apparent form FIGS. 1 and 3, the nut 7 is arranged outside the distal end portion of the pole, i.e., on the male screw portion 15 of M14, to fix the seal and the pole to each other. For this reason, the female screw portion of M6 is arranged at a level equal to that of the male screw portion 15, force acts in the external direction when the bolt is fastened to the female screw portion of M6. Therefore, when the female portion of M6 is fastened or loosened many times, influence acts on a fastening force of the nut 7 to the male screw portion of M14.

More specifically, in the sectional structure of the main part of the secondary battery, a position where stress caused by fastening the nut is concentrated is close to a position where stress caused by fastening the bold for fixing a bus bar or the like is concentrated, the pole may be broken. When the diameter of the pole is increased to cope with this, the energy density of the battery disadvantageously decreases.

Because of pure aluminum (A1050) serving as a material having low hardness, the distal end of the pole 10 is collapsed by a surface pressure generated by fastening the bolt 19. At this time, fastening axial tension decreases, and the screw is loosened.

For this reason, the female screw portion 16 of M6 is escaped by a counter bore at a level equal to that of the male screw portion 15 of M14. In this case, a distance 1 from the end face of the distal end portion of the pole 10 to the upper end of the female screw portion 16 is set to be 20 mm in consideration of a margin from the end of the male screw portion 15 (see FIG. 3).

With the above structure as shown in FIG. 3, stress concentration at the position where stress is concentrated by fastening the nut 7 can be moderated by compression force generated by fastening the bolt 19. In addition, even if the end face of the distal end of the pole 10 is collapsed, since an amount of extension of the bolt 19 is large, i.e., the amount of extension of the bolt 19 increases because the counter bore length 1 (see FIG. 3), a decrease in axial tension can be reduced. That is, the screw can be prevented from being loosened.

The required length of the female screw portion 16 will be described below.

The female screw portion 16 of M6 is used to fix a bus bar or a conductive line to the pole 10 to extract current energy. Since the secondary battery of this embodiment is a large-size battery of 10 to 500 Ah, even if a current flows in the battery at a 1C discharge rate, a contact failure dangerously occurs because the bus bar or the conductive line is incompletely attached. In particular, when the battery is mounted on an automobile as an electric automobile secondary battery, the battery must withstand vibration, and strong fastening force is required as a matter of course.

In this embodiment, the base material of the positive electrode of the female screw portion 16 is pure aluminum (A1050), and has a very small elastic limit, i.e., about 7.6 kgf/mm$^2$. Note that the hardness of the female screw portion 16 is set within the range of HV34 to HV35.

In order to making the fastening force equal to that of the base material of a stainless steel bolt, a shearing force acting on one thread in fastening must be decreased, and the number of threads must be increased. For this reason, the length of the female screw portion 16 must be increased.

A required length of the female screw portion 16 was calculated in an experiment.

Figure 7:
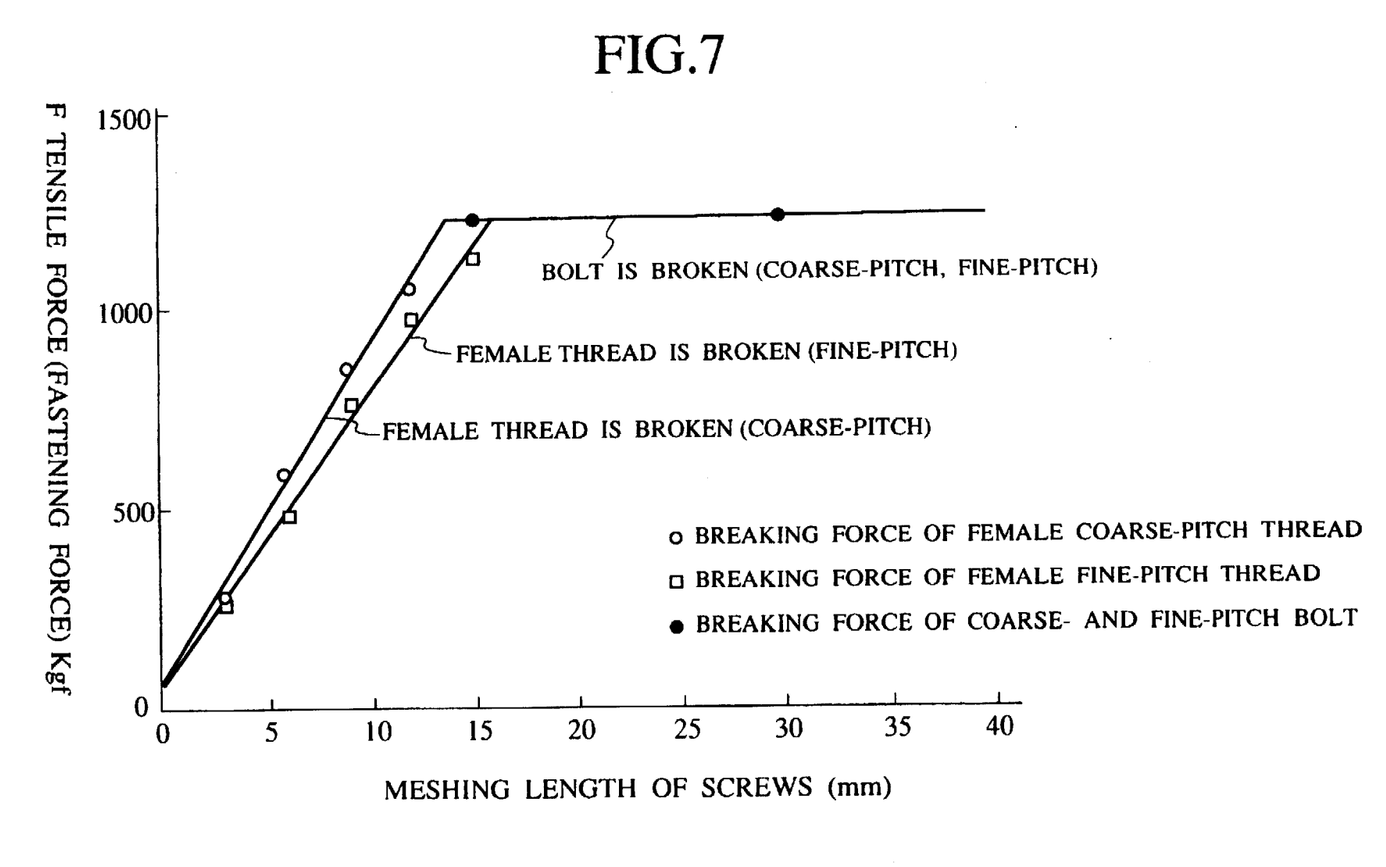
FIG. 7 is a graph illustrating a shear fracture test of a female screw consisting of pure aluminum (A1050).

FIG. 7 shows the relationship between tensile force (fastening force) and the breaking points of the screws when the female screw consists of pure aluminum (A1050) and the male screw consists of SUS304. More specifically, FIG. 7 shows results obtained such that the relationship between "meshing length of screws" (see FIG. 1) and tensile force (fastening force) of the female screw containing pure aluminum as a base material and the male screw containing SUS as a base material.

In this case, two types of pitches, i.e., a coarse pitch and a fine pitch, were examined as the pitches of threads. The fine pitch means a pitch smaller than the coarse pitch.

In FIG. 7 showing measurement values, two straight portions which indicate the tendencies of the measurement values using right-up inclined lines mean that the threads of the female screw are broken before the bolt is broken. In FIG. 7 showing the measurement values, one straight portion which indicates the tendencies of the measurement values using a line parallel to the abscissa means that the bolt is broken before the threads of the female screw are broken. The measurement here was performed on the fine-pitch threads and the coarse-pitch threads.

As is apparent from FIG. 7, when the meshing length of the screws becomes about 15mm or more in the coarse-pitch threads, the bolt itself is broken.

Therefore, the following finding can be obtained. That is, in order to make the strength of the female screw of M6 equal to the strength of the base material of the stainless steel bolt, the meshing length of the screws must be 15 mm or more.

In this embodiment, the meshing length of screws is made larger than 15 mm by using a female screw and bolt each having coarse-pitch threads.

In the battery, an optimum position at which the female screw portion 16 of the pole 10 is arranged will be described below.

When the long female screw portion 16 is arranged in the battery, outside the electrode portion, a space portion, i.e., a useless space, increase in volume, the volume energy density of the battery decreases. For this reason, the battery is disadvantageously arranged in a limited space like a battery mounted on an automobile.

A battery mounted on an automobile generally has a large capacity, e.g., 50 Ah or 100 Ah. For this reason, the battery is constituted by a cylindrical battery, the cylinder is formed to have a large diameter of 66.7 mm and a length of 386.5 mm. In this case, the spindle 31 itself must be increased in size to some extent because a 3 to 4 mm spindle for an AV secondary battery has a lack of rigidity.

For this reason, the spindle arranged at the center portion can be increased in size to have an outer diameter of 17 mm, and the female screw portion 16 of M6 can be stored in the space inside the spindle. Even if the spindle is removed after the electrodes and separators are wound, a cylindrical space is formed at the center of the wound electrodes. For this reason, the female screw portion 16 of M6 can also be stored in the space.

Therefore, according to this embodiment, when the female screw portion 16 of M6 and the electrode winding portion are caused to overlap, a volume energy density can be considerably increased.

As shown in FIGS. 1 and 3, the spindle 31 having an outer diameter of 17 mm and an inner diameter of 14 mm is insulated from the pole 10 by an insulating collar 12 consisting of polypropylene (PP).

The structure of the negative electrode of the pole is the same as that of the positive structure as shown in FIG. 5.

Since the lithium-ion secondary battery of this embodiment has a large capacity, when the battery is constituted by a cylindrical battery, both the diameter and the length of the cylinder are large. In this case, the spindle 31 itself must be increased in size to some extent to assure its rigidity.

For this reason, the spindle 31 arranged at the center portion can be increased in size to have an outer diameter of 17 mm, and the female screw portion 16 of M6 can be stored in the space inside the spindle.

Therefore, according to this embodiment, when the female screw portion 16 of M6 and the electrode winding portion are caused to overlap, a volume energy density can be considerably increased.

As shown in FIG. 1, the spindle 31 is insulated from the pole 10 by the insulating collar 12 consisting of polypropylene (PP).

In the battery of this embodiment, the pole 10 must be completely insulated from the cap (lid) 1, and the battery vessel 17 can be completely air-tightly sealed to prevent the inside of the battery vessel 17 from communicating with the outside thereof.

In order to achieve this object, sealing and insulating are generally performed by using an elastic member consisting of a polymer material such as PP in place of the ceramic washer 5 and the ceramic patch 6 shown in FIG. 1.

In short, the following structure is formed. That is, the pole and the nut interpose the cap of the battery vessel through an insulator, and the battery is completely air-tightly sealed to prevent the inside of the battery vessel 17 from communicating with the outside thereof.

However, when an elastic material such as PP which is generally used is used, and the pole fastening nut is strongly fastened to completely seal the battery, the elastic material such as PP exceeds its elastic limit to be broken. On the other hand, when the nut is properly fastened within the elastic limit to prevent the elastic material from being broken, although the elastic material can properly assure air-tightness at the beginning such that a creep is gradually deformed, leakage occurs. At this time, the fastening nut begins to be loosened, and the performance of the battery may be degraded.

Therefore, in a general battery, a crimp method having the following arrangement has been employed. That is, a gasket consisting of PP or the like for performing insulating and sealing is interposed between the outer cylinder of the battery vessel and the metal corresponding to the pole, the outer cylinder of the battery vessel is bent, a gasket seal material such as PP is pressed within the elastic limit.

In this embodiment, as shown in FIGS. 1 and 2, the ceramic washer 5 has a disk-like shape having a circular hole at its center, and is interposed between the nut 7 and the cap 1. The material of the ceramic washer 5 is alumina ($Al_2O_3$).

Although the ceramic washer 5 is used to insulate the pole 10 from the cap 1, since the ceramic washer 5 consists of alumina, insulating properties can be assured.

Since the pole 10 is fixed to the cap 1 by fastening the nut 7, the ceramic washer 5 and a ceramic patch 6 (to be described later) must have rigidity to sufficiently withstand the fastening force, i.e., a compression force. With respect to this point, the ceramic washer 5 consists of alumina, the ceramic washer 5 can sufficiently withstand the fastening force, i.e., the compression force, caused by the nut 7. In addition, since the material of the ceramic washer 5 is alumina, the ceramic washer 5 does not change in shape a long period of time after fastening in comparison with the polymer material such as PP. For this reason, strong fastening force can be maintained for a long period of time.

Since alumina does not change in rigidity with respect to a change in temperature, the fastening force can be maintained even if temperature changes in a wide range. More specifically, alumina can achieve required properties within a wide temperature range of about −30° C. to 70° C.

Since alumina has rigidity considerably higher than that of a polymer material such as PP, the nut 7 can be more strongly fastened compared with the polymer material such as PP. As a result, strong fastening force can be obtained, the nut 7 is not loosened with time due to vibration generated when the battery is mounted on an automobile, and sufficient sealing properties can be obtained. Therefore, air-tightness can be held such that a nonaqueous electrolytic solution can be prevented from leaking.

As the material of the ceramic washer 5, not only aluminum, but also other ceramic materials such as zirconia ($ZrO_2$) can be used.

The ring 50 is arranged between the ceramic washer 5 and the ceramic patch 6 and between the inside of the cap 1 and the outside of the pole 10. The ring 50 has a rectangular ring as a sectional shape, and consists of a polymer material such as PP. The ring 50 is used to hold the central axis of the pole 10 at the central axis of the battery in the longitudinal direction when the pole 10 is fixed to the cap 1.

The ceramic patch 6 is interposed between the inner surface of the cap 1 and the disk-like portion 20 of the pole 10. This ceramic patch 6 has a disk-like shape having a circular hole at its center like the ceramic washer 5, and consists of alumina ($Al_2O_3$).

Although the ceramic patch 6 is used like the ceramic washer 5 to insulate the pole 10 from the cap 1, since the material of the ceramic patch 6 is alumina described above, the insulating properties can be assured.

Since the pole 10 is fixed to the cap 1 by fastening the nut 7, the ceramic patch 6 must have rigidity to sufficiently withstand the fastening force, i.e., a compression force. With respect to this point, the ceramic patch 6 can sufficiently withstand the fastening force, i.e., the compression force, caused by the nut 7. In addition, the ceramic patch 6 does not change in shape a long period of time after fastening. For this reason, strong fastening force can be maintained for a long period of time.

Since alumina does not change in rigidity with respect to a change in temperature, the fastening force can be maintained even if temperature changes in a wide range. More specifically, alumina can achieve required properties within a wide range of about −30° C. to 70° C.

The ceramic patch 6 can obtain strong fastening force, the nut 7 is not loosened with time due to vibration generated when the battery is mounted on an automobile, and sufficient sealing properties can be obtained. Therefore, air-tightness can be held such that a nonaqueous electrolytic solution can be prevented from leaking.

Furthermore, the ceramic patch 6 has the following objects.

More specifically, since the seal 8 is interposed between the cap 1 and the disk-like portion 20 of the pole 10, the seal 8 is elastically deformed such that the dimension in the axial direction of the pole decreases. As a result, reaction force is generated in the axial direction of the pole 10. By using this reaction force, liquid-tightness between the seal 8 and the inside of the cap 1 and liquid-tightness between the seal 8 and the surface of the disk-like portion 20 of the pole 10 can be obtained.

However, when the seal 8 is elastically deformed by compression force, if any stopper is not arranged in the axial direction of the pole 10 and the direction perpendicular to the axial direction, the seal 8 can be easily deformed due to its elastic characteristics. Therefore, strong reaction force in the axial direction of the pole 10 cannot be expected. For this reason, the sealing force of the seal 8 becomes weak.

The size of the outer periphery of the ceramic patch 6 is set at a position where elastic deformation of the seal 8 does not occur to some extent or more, so as to prevent large elastic deformation of the seal 8. As a result, the reaction force of the seal 8 in the axial direction of the pole 10 can be increased. When the ceramic patch 6 is arranged as described above, the sealing force of the seal 8 can be increased to a sufficient high level.

As the material of the ceramic patch 6, not only aluminum, but also other ceramic materials such as zirconia ($ZrO_2$) can be used.

The backup ring 51 is arranged on the outer periphery of the seal 8 to be in contact with the seal 8. The backup ring 51 consists of PP.

The backup ring 51 prevents the seal 8 from being deformed when the seal 8 is brought into contact with the nonaqueous electrolytic solution present in the battery, expands, and is deformed, thereby preventing the reaction force of the seal 8 in the axial direction of the pole 10 from being decreased.

As described above, according to this embodiment, when the ceramic washer 5 and the ceramic patch 6 are arranged, the insulating properties between the pole 10 and the cap 1 can be assured.

The ceramic washer 5 and the ceramic patch 6 can withstand fastening force, i.e., compression force, for fixing the pole to the cap 1 by fastening the nut 7.

The ceramic washer 5 and the ceramic patch 6 do not change in shape a long period of time after fastening. For this reason, strong fastening force can be maintained.

Since ceramic does not change in rigidity with respect to a change in temperature, the fastening force can be maintained even if temperature changes in a wide range.

Since ceramic has very high rigidity, strong fastening force can be obtained. The nut 7 is not loosened with time due to vibration generated when the battery is mounted on an automobile, and sufficient sealing properties can be obtained.

The ceramic patch prevents the seal 8 from being elastically deformed. As a result, the reaction force of the seal 8 in the axial direction of the pole 10 can be increased, and the sealing force of the seal 8 can be increased to a sufficient level.

As shown in FIGS. 1 and 2, an opening valve unit 9 is arranged at a position outside the center of the cap 1. The opening valve unit 9 is fixed to the hole formed in the cap 1 by a screw manner.

The opening valve unit 9 is used to discharge the internal gas out of the vessel when the internal pressure of the battery vessel increases.

Valves arranged in the opening valve unit 9 are pressed against the inside of the battery by a spring to keep the liquid-tightness in the battery.

When the internal pressure in the battery increases due to any cause, the valves in the opening valve unit 9 are pressed against the outside of the battery. As a result, the gas in the battery is discharged out of the vessel through a gap formed by moving the valves and through a hole formed in the side surface of the opening valve unit 9. Because the opening valve unit 9 is arranged, even if the internal pressure increases, the pressure can be prevented from exceeding a predetermined pressure.

As shown in FIG. 1, an electrolytic solution injection port 32 is arranged at a position outside the center of the cap 1. The electrolytic solution injection port 32 is used to inject the electrolytic solution into the battery after the battery structure is assembled.

As shown in FIGS. 1 and 2, an expansion plug 4 is arranged at the position of the electrolytic solution injection port outside the center of the cap 1. The expansion plug 4 is screwed in the electrolytic solution injection port 32 to be fastened through the metal seal 2, thereby air-tightly sealing the battery vessel.

The metal seal 2 is interposed between the head portion of the expansion plug 4 and the surface of the cap 1. The sectional shape of the metal seal 2 is a rectangular ring, and the metal seal 2 consists of pure aluminum.

On the other hand, metal portions being in contact with the metal seal 2 correspond to the cap 1 of the battery and the head portion of the expansion plug 4, and consist of stainless steel (SUS304).

The following was confirmed. That is, even if two types of metals, i.e., stainless steel and pure aluminum were brought into contact with each other and brought into contact with the nonaqueous electrolytic solution of the battery of this embodiment, corrosion did not progress.

As described above, when the metal seal consisting of pure aluminum is used, the transparency and permeability with respect to external gas or moisture can be suppressed to a level lower than that of a seal consisting of a polymer material such as a rubber material, and the service life of the battery can be prolonged.

The pure aluminum has a service life longer than that of the polymer material. For this reason, when the metal seal is used as a seal for the expansion plug, the metal seal can be used almost indefinitely, and the seal need not be exchanged.

As shown in FIG. 1, a metal seal can be used as the seal for the opening valve unit 9 for releasing pressure.

A method of injecting a nonaqueous electrolytic solution into the battery vessel will be described below.

An injection attachment is screwed in the electrolytic solution injection port 32 to be fixed. In this manner, the nonaqueous electrolytic solution stored in an electrolytic tank (EL) communicates with the battery vessel through a pipe. A space portion higher than the level of the nonaqueous electrolytic solution in the electrolytic solution tank communicates with a vacuum pump through a switching valve.

The electrolytic solution used in this embodiment is prepared by dissolving $LiPF_6$ in a solvent mixture of propylene carbonate and dimethyl carbonate at a ratio of 1 mol/1.

The vacuum pump is operated. When the vacuum pump is operated, air in the battery is discharged out of the battery vessel, the internal pressure of the battery vessel is lower than the atmospheric pressure.

The switching valve arranged between the vacuum pump and the electrolytic solution tank is switched to expose the liquid surface of the electrolytic solution tank to the atmospheric air. At this time, the pressure in the tank becomes higher than that in the battery vessel, and the nonaqueous electrolytic solution in the tank is pressed out to be inserted in the battery vessel.

When the above process is repeated several times, the predetermined nonaqueous electrolytic solution can be injected in the battery vessel.

Upon completion of injection of the nonaqueous electrolytic solution, the battery vessel must be sealed to prevent the electrolytic solution from being out of the battery. For this reason, the expansion plug 4 is screwed in the electrolytic solution injection port 32 through the metal seal 2 to be fastened, thereby air-tightly sealing the battery vessel.

The present invention is not limited to the embodiment described above, and various arrangements can be effected without departing from the spirit and scope of the present invention as a matter of course.

What is claimed is:

1. A secondary battery in which a thin-film positive electrode, a thin-film negative electrode, and a separator are wound and stored in a battery vessel, comprising:

a cap for sealing an end opening portion of said battery vessel;

a pole penetrating through said cap and having a disk-like portion;

a nut arranged at the distal end portion of said pole;

a ceramic washer being in contact with said nut; and a ceramic patch being in contact with the disk-like portion, wherein said cap is interposed between said ceramic washer and said ceramic patch and fastened by the disk-like portion of said pole and said nut.

2. A secondary battery according to claim 1, wherein said ceramic washer and said ceramic patch are of alumina or zirconia.

3. A secondary battery according to claim 1, wherein said secondary battery is a nonaqueous electrolytic secondary battery.

4. A secondary battery according to claim 1, wherein said secondary battery is a lithium secondary battery.

5. A secondary battery according to claim 1, wherein said secondary battery is a large-size battery having an electric capacity of 10 to 500 Ah.

6. A secondary battery comprising:

a battery vessel;

an electrode roll member obtained by winding a thin-film positive electrode, a thin-film negative electrode, and a thin-film separator and stored in said battery vessel;

a pole arranged at an opening portion of said battery vessel and having a female screw portion with which a bolt for interposing a bus bar or a conductive line between said bolt and said pole is meshed, said female screw portion being arranged in a central space of said electrode roll member.

7. A secondary battery according to claim 6, wherein said secondary battery is a nonaqueous electrolytic secondary battery.

8. A secondary battery according to claim 6, wherein said secondary battery is a lithium-ion secondary battery.

9. A secondary battery according to claim 6, wherein said secondary battery is a large-size battery having an electric capacity of 10 to 500 Ah.

* * * * *